Nov. 7, 1944.　　　　F. M. WIESE　　　　2,362,425
TIME MEASURING EQUIPMENT
Filed Dec. 26, 1942　　　9 Sheets-Sheet 1

INVENTOR
F. M. WIESE DECEASED
ELEANOR K. WIESE
HIS EXECUTRIX
BY P. C. Smith
ATTORNEY Nov. 7, 1944. F. M. WIESE 2,362,425
TIME MEASURING EQUIPMENT
Filed Dec. 26, 1942 9 Sheets-Sheet 3

INVENTOR
F. M. WIESE DECEASED
ELEANOR K. WIESE
HIS EXECUTRIX
BY P. C. Smith
ATTORNEY Nov. 7, 1944.　　　　F. M. WIESE　　　　2,362,425
TIME MEASURING EQUIPMENT
Filed Dec. 26, 1942　　　　9 Sheets-Sheet 6

INVENTOR
F. M. WIESE DECEASED
ELEANOR K. WIESE
HIS EXECUTRIX
BY P. C. Smith
ATTORNEY

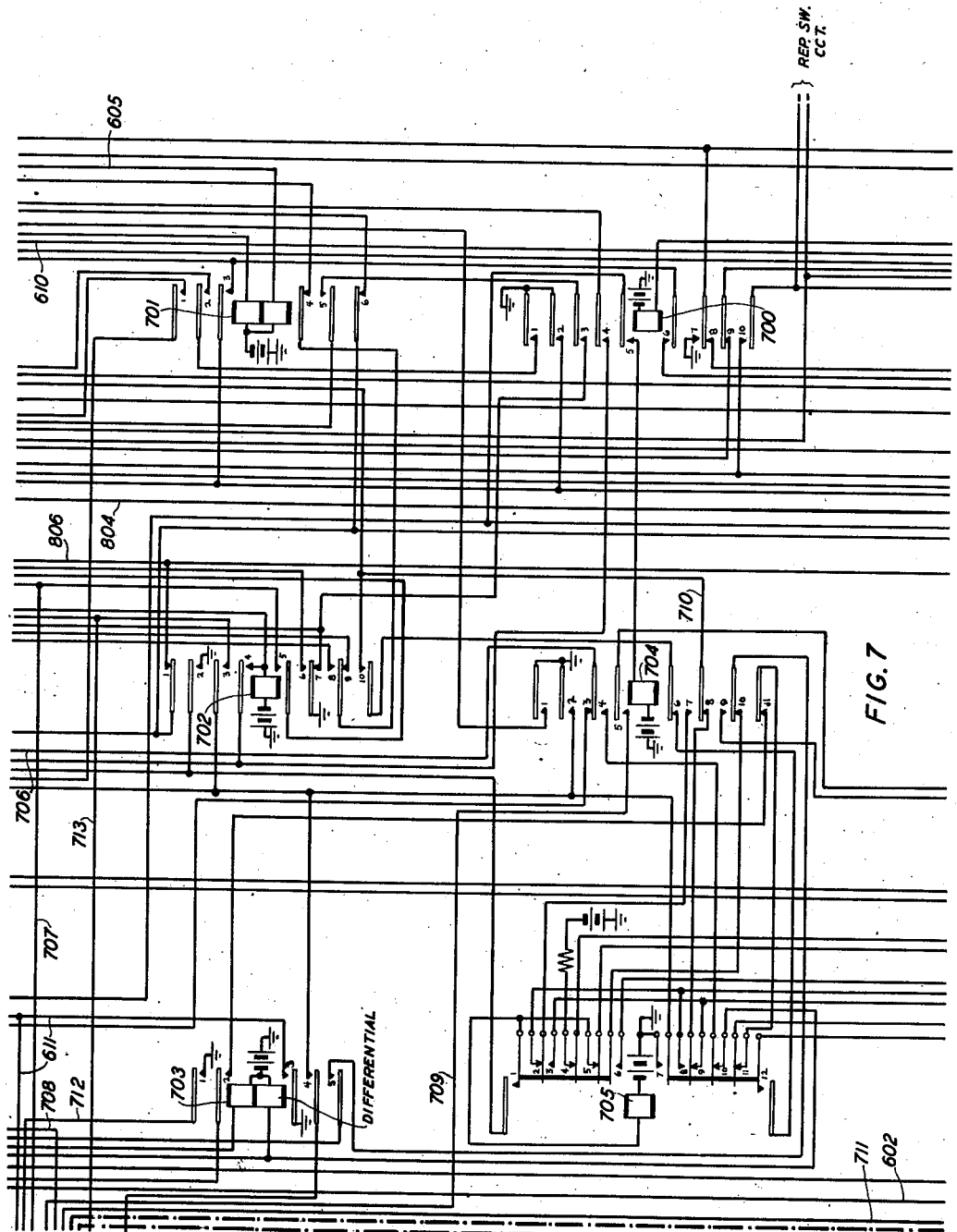

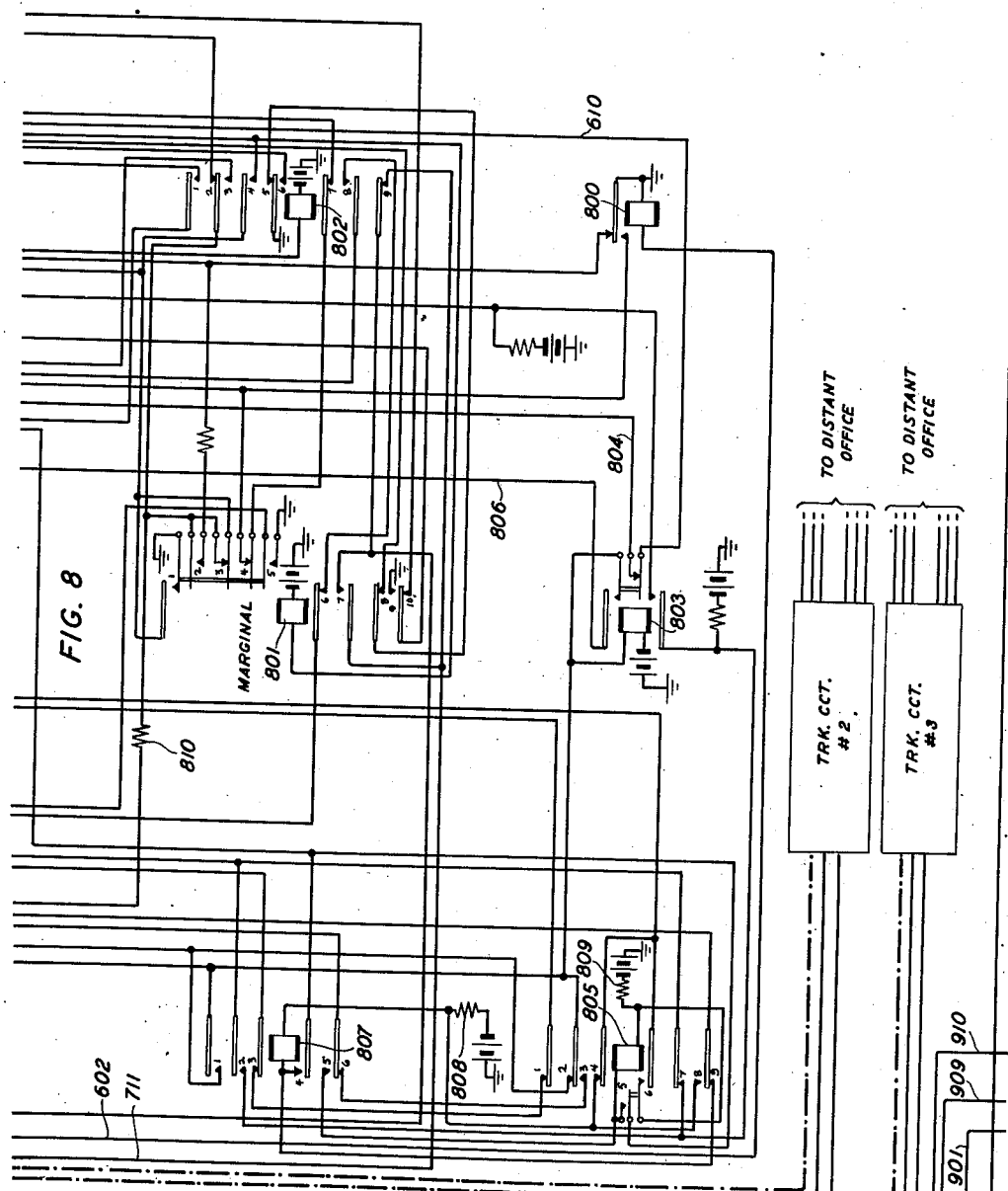

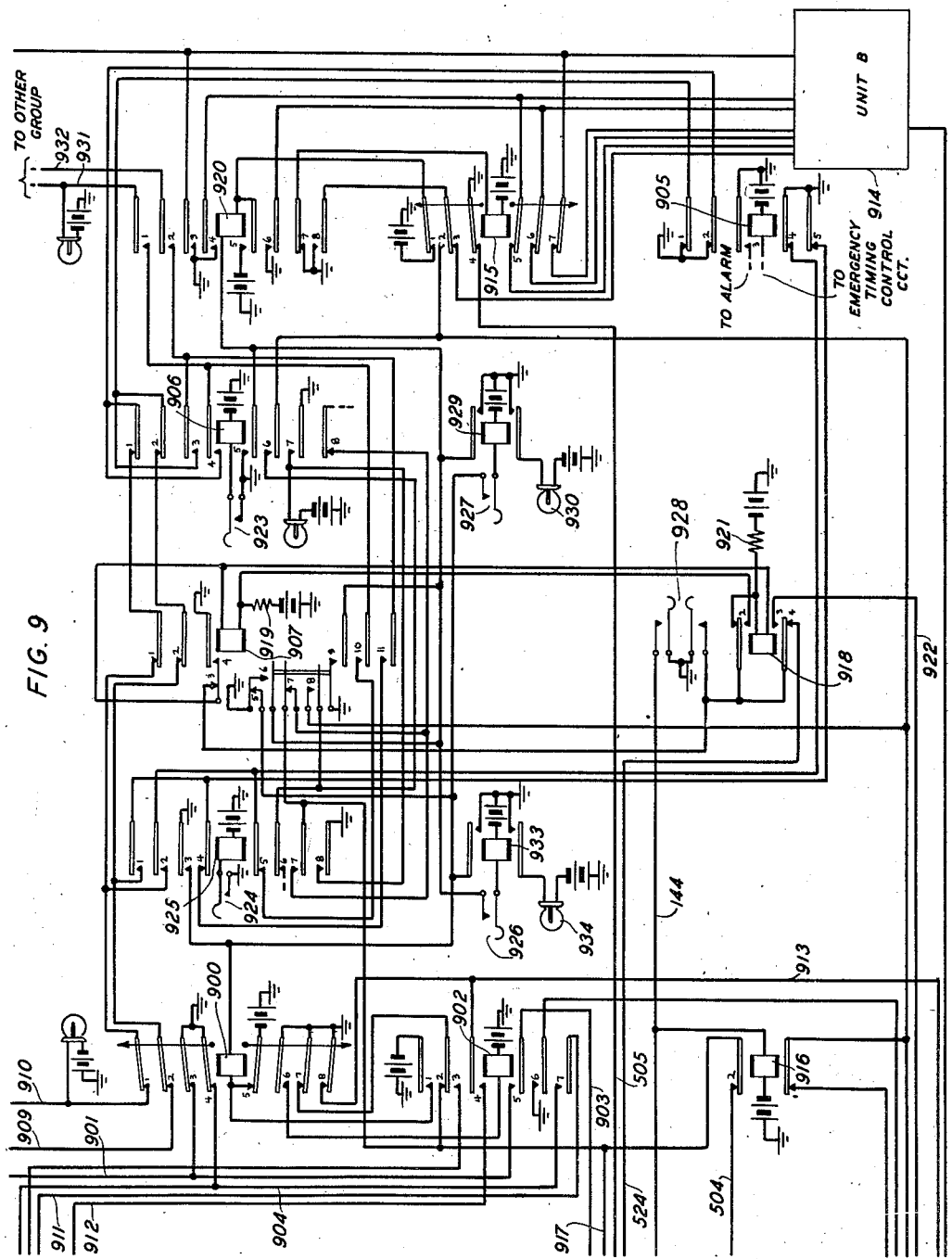

Patented Nov. 7, 1944

2,362,425

UNITED STATES PATENT OFFICE 2,362,425

TIME-MEASURING EQUIPMENT

Floyd M. Wiese, deceased, late of Elizabeth, N. J., by Eleanor K. Wiese, executrix, Elizabeth, N. J., assignor to Bell Telephone Laboratories, Incorporated, New York, N. Y., a corporation of New York Application December 26, 1942, Serial No. 470,263

19 Claims. (Cl. 179—7.1)

This invention relates to telephone systems and has for its object the provision of improved time measuring equipment for use in such systems.

The timing of various functions in automatic telephone systems is well known. However, the interrupting mechanisms used for this purpose are usually permanently associated with the circuits requiring the timing operation. These interrupting mechanisms pass through constantly recurring cycles and customarily measure the time interval either between successive closures of a single contact or between the closures of two contacts. In either case the time interval measured may vary from slightly more than one cycle to slightly less than two cycles depending upon the point in the cycle at which the associated circuit calls upon the interrupting mechanism. The longer the time interval to be measured the greater is the time wasted in waiting for the start of the timing cycle.

In accordance with the present invention, timing means is provided common to a plurality of circuits with means for connecting one of said circuits with said timing means only at the beginning of the time interval.

More specifically the present invention provides a plurality of levels with means for preparing the levels in rotation during a fraction of the timing cycle, permitting the circuits requiring a timing operation to connect only with a prepared level and for transmitting a signal to each level at a measured time interval after it is prepared.

The means for connecting the circuit to be timed with the timing device comprises a plurality of cross bar switches in which each circuit appears as a vertical set of contacts and a hold magnet. The select magnets are prepared for operation in rotation, but can operate only when a circuit requires timing, and the hold magnet of the circuit can operate only after the select magnet of a level has been operated. After both the select magnet and the hold magnet have operated the select magnet is released and the circuit is locked to the level until it receives a signal at the end of the time interval. The circuit responds to this signal to release the connection with the level.

In addition, the timing device provides a plurality of time intervals and the trunk circuit is so arranged that it will respond to the signal and release the timing device only at the end of the proper interval.

These and other features of the invention will be apparent from a consideration of the following description read in connection with the drawings in which:

Figs. 6, 7 and 8 show one complete trunk circuit;

Fig. 9 shows the change-over circuit; and

Fig. 10 shows the manner in which Figs. 1 to 9 are to be arranged.

Figure 1:
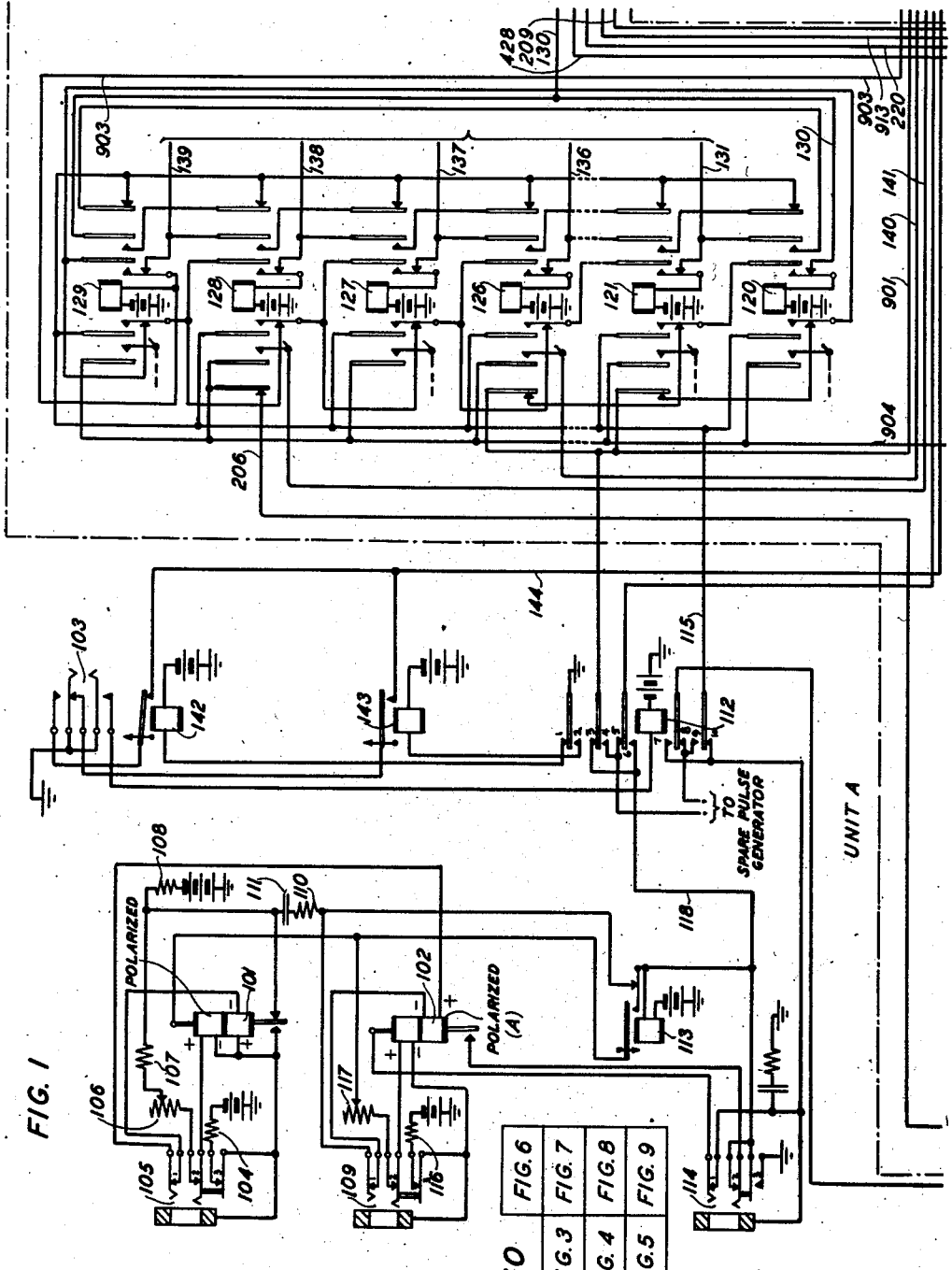
Fig. 1 shows the primary pulse generating circuit and the primary relay distributor.

The timing arrangement forming the subject of the present invention is especially designed for use in toll offices where incoming calls are distributed automatically to the operators' positions and where the operators are assisted in their duty by positional register senders, etc. Such a toll office is described in United States Patent 2,236,246 granted to G. V. King et al., March 25, 1941.

Briefly, after a connection has been set up under the control of such an operator's position, the position is disconnected from the trunk but must be reconnected to the trunk if no answer is received or if the distant operator or subscriber flashes. The trunk circuit therefore requires timing means to control this reconnection after a sufficient time interval to allow for response and also to distinguish between the spaced answer and release signals accompanying a completed call and those which indicate a recall.

The common timing arrangement of the present invention is controlled by a condenser-timed relay interrupter which operates a distributor, comprising a chain of ten relays, in continuous rotation. The trunks are connected to the timing circuit by means of a number of cross bar switches, each trunk appearing in one vertical of one switch. Each relay of the distributor causes partial closure of the circuits of the select magnets of one level in all of the switches, and when a trunk is ready for timing, the trunk causes the completion of the select magnet circuit partially closed at that time in that switch in which the trunk appears. The hold magnet of the trunk vertical is then operated, the trunk is locked to the timing circuit and the select magnet is released.

Each chain relay also controls the transmission of signals to two levels of all switches and these levels are the ones prepared by predetermined previous relays of the chain so that fixed times will elapse between the locking of a trunk to a level and the reception of one of the signals.

For the long time interval, a secondary pulse generator and distributor is employed operating from the above-mentioned primary generator and distributor.

Before describing the operation of the timing circuit, a description will be given of the operation of the trunk circuit with which the timing circuit functions. When a call is directed to the trunk circuit of Figs. 6, 7 and 8, ringing current will be applied to the trunk conductors 617 and 618, operating signaling circuit 619 to cause the connection of battery to conductor 600, which completes a circuit over contact 4 of relay 601, conductor 602, to the winding of relay 800 and ground. Relay 800 closes a circuit from ground at its front contact, over contact 4 of relay 801, contact 7 of relay 802 to the winding of relay 700 and battery. Relay 700, at contact 2, closes a locking circuit for itself independent of relay 800. At the end of the ringing signal relay 800 releases, connecting ground over its back contact, contact 6 of relay 700, contact 9 of relay 603, and the upper winding of relay 701 to battery. With relay 701 operated, ground from contact 7 of relay 702 is extended over contact 3 of relay 700, contact 5 of relay 701 and contact 1 of relay 603 to conductor 604, leading to the operator's link and control circuit to cause an idle channel in an idle occupied operator's position to be attached to the trunk circuit. When this has been done, ground is connected to conductor 605 causing the operation of relay 603. Relay 603 opens the operating circuit for relay 701 but ground on conductor 605 holds relay 701 operated. In addition, relay 603 closes a holding circuit for itself from battery through its lower winding, conductor 610, normal contacts of relay 803, conductor 804, contact 8 of relay 603, contact 6 of relay 700 to ground at the back contact of relay 800.

After the position circuit has received a class indication from the trunk, ground is connected to conductor 606, operating relays 607 and 608. These relays extend the talking conductors of the trunk to the operator's position, relay 608 also closing a supplementary holding circuit for relay 701. The operator then obtains the necessary information for extending or completing the connection and sets up the number on her keyset, which controls a sender and in turn a marker to extend the connection to the desired office. The operator's position is then disconnected from the trunk and relays 607 and 608 release, followed by relay 701. With relay 607 released, either relay 609 or relay 702, or both are operated, from the control circuit, depending upon the nature of the office to which the call has been extended. For example, relay 609 is operated in the case of a terminating call, relay 702 in the case of a call to another toll office and both relays are operated if the marker fails to complete the connection because of an overflow condition. Either relay operated locks over its own front contact, contact 4 of relay 700 and contact 4 of relay 608 to ground.

Since the operation of either relay 609 or relay 702 without the other indicates that the work of the operator at this stage has been completed and that the next operation to be expected is a response by the operator or equipment at the office to which the call has been extended, the operation of either relay 609 or relay 702 closes a circuit for operating the timing control relay 703. This circuit may be traced from battery through the upper winding of relay 703, contact 10 of relay 601, contact 3 of relay 704, conductor 706, either over contact 9 of relay 609 and contact 8 of relay 702, or over contact 8 of relay 609 and contact 9 of relay 702, and thence over contact 4 of relay 701, contact 4 of relay 603 to conductor 611, to which ground is connected from the timer circuit as will be described hereinafter. Relay 703 when it operates at its contact 3 connects ground to conductor 611 to provide a holding circuit for itself after the timing circuit has removed ground from conductor 611. The operation of relay 703 starts an 80-second time interval within which the called subscriber or operator should answer.

If no response is received within 80 seconds, ground from the timing circuit is connected to conductor 707, completing a circuit over contact 4 of relay 609, or over contact 5 of relay 702 and contact 3 of relay 609, contact 6 of relay 601, contact 2 of relay 703, contact 11 of relay 704, contact 11 of relay 705, contact 2 of relay 805 to the winding of relay 803 and battery. Relay 803 closes a locking circuit for itself over its upper contact, conductor 806, contact 8 of relay 608, contact 2 of relay 601 to ground at contact 2 of relay 609 or contact 2 of relay 702. At its middle contact, relay 803 opens the locking circuit of relay 603 which now releases, in turn releasing the timing control relay 703 to release the timing circuit. Relay 603 released permits relay 701 to reoperate and function as before to connect an operator's position with the trunk. Relay 803 operated causes the operator to receive an indication that no response has been received on the circuit to which she has been connected.

When the called subscriber or operator responds, ground is connected to the tip and ring conductors 612 and 613 in parallel, completing a circuit over contacts 1 and 9 of relay 608, through the windings of coil 614, and the upper and middle windings of relay 601 in parallel, and thence over contact 5 of relay 700 to the winding of relay 704 and battery. Relay 704 operates, opening the above-traced circuit for relay 703 and closing a circuit from battery through the lower winding of the timing control relay 703, contact 10 of relay 705, contact 4 of relay 704 to conductor 706 and thence as above traced to ground. Since relay 703 is differentially wound, the closure of this circuit causes a reversal of flux in the windings of that relay which causes it to release. When the timing circuit is normal, ground is again connected to conductor 611 and relay 703 reoperates and locks. A timing interval of two seconds is now measured to determine whether the response was final or whether it was a part of a series of flashes indicating that the attention of an operator is required.

When relay 704 operates it closes a circuit from battery through resistance 808, winding of relay 807, contact 9 of relay 805, contact 2 of relay 705, contact 7 of relay 704, conductor 710, contact 5 of relay 603, contact 6 of relay 701 over contact 1 of relay 702 or over contact 10 of relay 609 to conductor 806 and ground, as previously traced. Relay 807 locks over its contact 4 and contact 1 of relay 702 or contact 10 of relay 609 to ground over conductor 806. At the end of two seconds ground is connected to conductors 708 and 709. Ground on conductor 709 is extended over contact 5 of relay 704 and contact 4 of relay 805 to resistance 808 and battery in shunt of the winding of relay 807 causing that relay to release.

With relay 807 released, ground on conductor 708 is extended over contact 11 of relay 601, contact 5 of relay 703, contact 9 of relay 704, contact 1 of relay 805, contact 3 of relay 807, contact 5 and winding of relay 705 to battery. Relay 705 locks over its contact 1 to ground at contact 2 of relay 609 or contact 2 of relay 702. The operation of relay 705 opens the circuit of relay 703, causing that relay to release in turn releasing the timing circuit.

When a terminating call is ended, relay 704 is released thereby reclosing the original operating circuit for relay 703. At the end of two seconds, ground is connected to conductor 708 completing a circuit over contact 11 of relay 601, contact 5 of relay 703, contact 10 of relay 704, contact 6 of relay 705, resistance 810, contact 3 of relay 801, contact 6 of relay 603 to the winding of relay 801 and battery. Relay 801 operates sufficiently to close contact 1, whereupon it operates fully closing its remaining contacts. Relay 801 in operating opens the circuit of relay 700 which releases, in turn releasing relay 603 and bringing about the recall of an operator to release the connection. The release of relay 603 also releases relay 703 to release the timing circuit. In the case of a call to another toll office, with relay 702 operated, the release of relay 704, immediately closes a circuit from battery through the winding of relay 803, contact 12 of relay 705, contact 6 of relay 704, contact 10 of relay 702, conductor 710, contact 5 of relay 603, contact 6 of relay 701, contact 10 of relay 609 to conductor 806 and ground as previously traced. Relay 704 causes the recall of an operator as above described.

If, during the two-second interval which is measured following the response at the called office, a single flash occurs, which might be accidental in character, relay 704 is released and reoperated. When relay 704 releases, it releases relay 703 but recloses the original operating circuit as above mentioned so that a new timing cycle is started as soon as the timing device releases, and when relay 704 reoperates relay 703 is again released and reoperated to start a new cycle. Since relay 807 is operated, the release of relay 704 closes a circuit from battery through resistance 809, winding of relay 805, contact 5 of relay 807, contact 9 of relay 705, contact 8 of relay 704 and thence to ground over conductor 710 as traced for operating relay 807. When relay 704 reoperates it extends ground from conductor 710, over contact 7 of relay 704, contact 2 of relay 705, contact 8 of relay 805 to resistance 808 in shunt of the winding of relay 807 causing relay 807 to release. Relay 805, being locked independent of relay 807, remains operated. In this case, at the end of the two-second interval, ground on conductor 709 is connected over contact 5 of relay 704, contact 6 of relay 805 to resistance 809 and battery in shunt of the winding of relay 805, causing that relay to release and close the previously traced circuit from conductor 708 to the winding of relay 705 and battery.

If a second flash occurs, the second release of relay 704 completes a circuit from ground on conductor 710, contact 8 of relay 704, contact 9 of relay 705, contact 6 of relay 807, contact 3 of relay 805 to the winding of relay 803 and battery. Relay 803 functions as previously described to release the timing circuit and to associate the trunk with an idle operator's position.

Relay 703 is also operated to cause the timing of a ringing signal directed toward the originating office by the operator. When the operator wishes to ring out over the incoming end of the trunk she operates a key at her position which applies ground and battery to the upper and middle windings of relay 601. Relay 601 operates and locks in a circuit from ground through its lower winding, over its contacts 7 and 8 to battery through resistance 615. With relay 601 operated, conductor 611 is connected over contact 9 of relay 601, to the lower winding of relay 703 and battery, operating relay 703 to connect the trunk with the timing circuit. With relay 601 operated, battery through resistance 616 is connected over contact 5 of relay 601 to conductor 600 to cause the signaling circuit 619 to transmit ringing current toward the originating office. At the end of one and a half seconds ground is connected to conductor 711, completing a circuit over contact 9 of relay 802, contact 8 of relay 601 to battery through resistance 615, in shunt of the lower winding of relay 601, thereby releasing relay 601 and terminating the ringing signal. Relay 601 releases relay 703, which in turn releases the timing circuit.

The timing operation itself is under the control of one of two primary pulse generators common to the office. The transfer circuit of Fig. 9, which will be described hereinafter, renders one or the other pulse generator effective. One of these pulse generators is shown in Fig. 1 and comprises polarized relays 101 and 102. With the pulse generator idle, relays 101 and 102 are included in two circuits one of which extends from battery through resistance 104, contact 3 of jack 105, upper winding of relay 101, contact 2 of jack 105, resistances 106 and 107, to battery through resistance 108. The other circuit may be traced from battery through resistance 104, contact 3 of jack 105, lower winding of relay 101, contact 1 of jack 105, lower winding of relay 102, contact 1 of jack 109, through resistance 110 and condenser 111 to battery through resistance 108. Since these circuits terminate in battery at both ends, neither relay 101 nor relay 102 is operated. When the pulse generator shown is to be made effective, relay 900 in the transfer circuit is operated, as will be explained hereinafter, grounding conductor 901 and completing a circuit over contact 3 of relay 112, conductor 118 to the winding of relay 113 and battery. Relay 113 is slow to operate and, during its operate time, ground is extended over its normal contacts to the lower windings of relays 102 and 101 in shunt of battery through resistance 108 and condenser 111 and resistance 110, causing these relays to move their armatures to the right, definitely opening the contact of relay 102 and closing the right contact of relay 101. As relay 113 operates, ground is connected over the alternate contacts of relay 113 to the armature of relay 101, while a branch of this circuit extends through resistance 117, contact 2 of jack 109, upper winding of relay 102, contact 3 of jack 109 to resistance 116 and battery. The current through the upper winding of relay 102 is in a direction to cause relay 102 to close its contact but its effect is neutralized by the current flowing through the lower winding at this time. Similarly, the ground on the armature of relay 101 is in shunt of battery through resistance 108 and completes an energizing circuit for the upper winding of relay 101 but the current flowing through the lower winding renders this circuit ineffective until relay 113 completely operates. During this interval also, ground is connected to the two sides of condenser 111 discharging it in preparation for the start of the pulse generation. When relay 113 opens its normal contacts, condenser 111 starts to charge through the lower windings of relays 101 and 102 and the direction of this charging current is such as to further delay the effectiveness of the upper windings of relays 101 and 102. When the charging current decreases sufficiently both relays 101 and 102 close their left contacts.

When relay 101 closes its left contact it connects ground on its armature in shunt of battery through resistance 104, thereby reversing the direction of current flow through both windings. The current in the upper winding of relay 101 is in a direction to cause it to reclose its right contact but the reversal of flow through the lower winding causes condenser 111 to discharge and recharge in the opposite direction, thereby again delaying the effectiveness of the upper winding. The effect of this charge and discharge current through the lower winding of relay 102 is to assist that relay in holding its left contact closed. When the charging current drops, relay 101 recloses its right contact again reversing the current through both windings of relay 101 and the lower winding of relay 102. The reversal of the current flow through the lower winding of relay 102 causes that relay to open its contact. With the closure of the right contact of relay 101 the pulse cycle is restarted and continues as long as relay 113 remains operated to connect ground to the armature of relay 101. At each closure of the left contact of relay 102, ground over conductor 118 is extended over contact 2 of jack 114, contact of relay 102, contact 1 of jack 114, contact 10 of relay 112 to conductor 115.

Resistance 117 is adjustable to control the per cent break of the pulse applied to conductor 115 which should be made approximately 22.5 per cent. The speed of the interrupter is controlled by means of the adjustable resistance 106 and should be such that one hundred pulses will be generated in approximately 27 seconds. Jacks 105, 109 and 114 are provided for testing the adjustment of the relays and the speed and per cent break of the interrupter. Once the primary pulse generator is started, a continuous train of pulses will be sent out on conductor 115, during which ground is alternately connected to conductor 115 for approximately .21 second and removed from it for approximately .06 second whereby six cycles will measure an interval of approximately 1.5 seconds and eight cycles an interval of approximately 2 seconds.

Relays 120 to 129 constitute a primary distributor made up of ten relays of which only six have been shown. At the time that relay 900 of the transfer circuit was operated, a circuit was momentarily closed from ground over contact 3 of relay 900, contact 5 of relay 902 to conductor 903, completing an operating circuit for relay 129. Relay 129 locked over its right alternate contacts and the left normal contacts of relay 120, left back contact of relay 121 to ground on conductor 901. The first ground impulse on conductor 115 from the impulse generator completes a circuit over the right back contact of relay 128, right front contact of relay 129, right normal contacts of relay 120 to the winding of relay 120 and battery, operating relay 120 which locks over its alternate contacts, left normal contacts of relay 121 and the left back contact of relay 126 to conductor 901. At its left alternate contacts relay 120 extends the locking circuit of relay 129 to conductor 115 so that relay 129 is held operated until the end of the pulse which operates relay 120. The same ground pulse which operates relay 120 is also extended over conductor 130. At the end of the first pulse relay 129 releases and ground is disconnected from conductor 130. The next pulse over conductor 115 completes a circuit which extends over the right back contact of relay 129, front contact of relay 120 to the winding of relay 121 and to conductor 131. Similarly each of the relays of the primary distributor is operated in turn. When relay 128 has been operated, the circuit for operating relay 129 extends from conductor 115 over the right back contact of relay 127 and the front contact of relay 128 so that the distributor relays constitute an endless chain which operates continuously as long as the pulse generator continues to feed pulses to conductor 115. Therefore ground is connected to conductors 130 to 139 in rotation for a time measured by the length of the pulse on conductor 115, that is, for .21 second.

Figure 3:
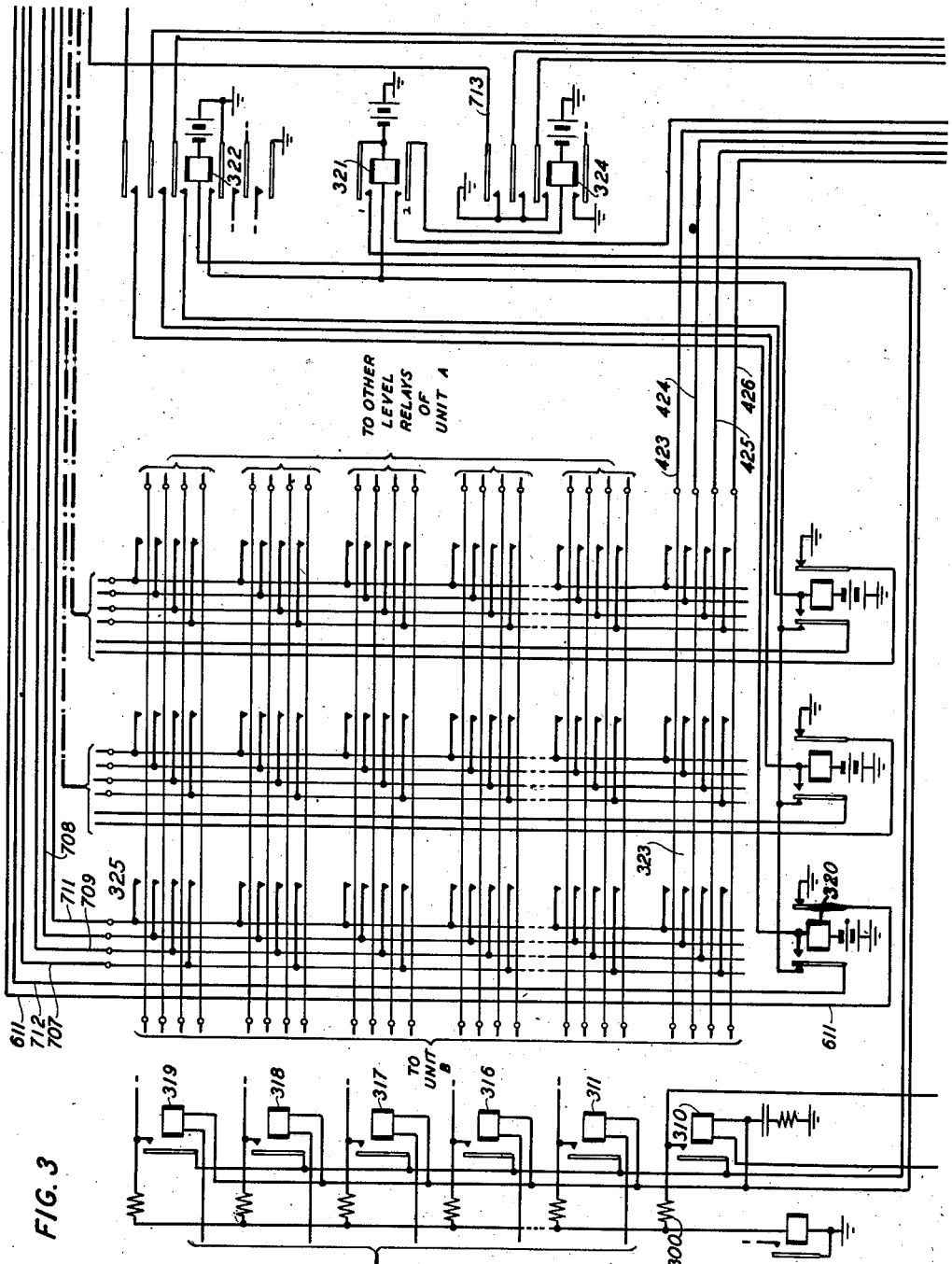
Fig. 3 shows a portion of one cross bar switch.

As previously mentioned, the timing circuit is connected with the trunk circuits by means of cross bar switches in which there is a set of vertical contacts individual to each trunk. Since the standard cross bar switch includes only twenty verticals a large toll office will require a large number of such switches. In Fig. 3 of the present disclosure, only three verticals have been shown and only six of the ten levels. At the same time that the transfer circuit of Fig. 9 is operated to make the impulse generator of Fig. 1 effective, circuits are closed over contacts 1 and 2 of relay 905, contacts 1 and 2 of relay 906, contacts 1 and 2 of relay 907, contacts 1 and 2 of relay 900, conductors 909 and 910 to the windings of relays 410 to 421. These relays, when operated, function in pairs to supply ground to the contacts of relays 403, 404, 405 and 406 which control the signals transmitted to the horizontal levels of the cross bar switches, and to contacts of relays 400, 401 and 402 for controlling the operation of the switches. Relays 410 to 421 are arranged in pairs to guard against falsely transmitting a ground pulse to a trunk because of a sticky or dirty contact or because of a false ground on one of the conductors 909 or 910. A chain circuit over contacts of these relays connects ground to conductor 422 to indicate to the alarm circuit that all of the relays 410 to 421 have operated.

As above mentioned, at the time that relay 120 is operated, ground is connected to conductor 130 closing an obvious circuit for relay 400 which in turn operates relays 401 and 402. Only a few of the contacts controlled by relay 400 have been shown and in order to provide sufficient contacts one or more additional relays may be connected in parallel with relay 400. At the end of the pulse which operated relay 120 ground is removed from conductor 130 and relays 400 to 402 are released. At the next pulse, which operates relay 121, ground is connected to conductor 131 and a set of relays similar to relays 400 to 402 is operated. Ten such sets of relays are provided and these sets are operated one at a time during one ground pulse by the impulse generator of Fig. 1. Relay 400, in operating, connects ground from contacts of relays 415 and 421, contact 3 of relay 400, contact of jack 407 to the winding of select magnet 310. Parallel and similar circuits are closed by relay 400 to the windings of the select magnets of the zero level in all of the switches. A parallel circuit is closed to the winding of magnet 310 over the contacts of relay 402. At contact 2, relay 400 also connects ground from the contacts of relays 415 and 421 to the contact of magnet 310, and in a similar manner grounds the contacts of the remaining select magnets of the zero level.

When ground is connected to conductor 131, the corresponding set of relays like relays 400 to 402 is operated; ground is connected to the winding and contact of select magnet 311 and to the windings and contacts of all of the other select magnets controlling the No. 1 level of the switches. Therefore, each level is prepared in turn for a period of .21 second but no action takes place unless a trunk is in need of a timing operation.

Figure 6:
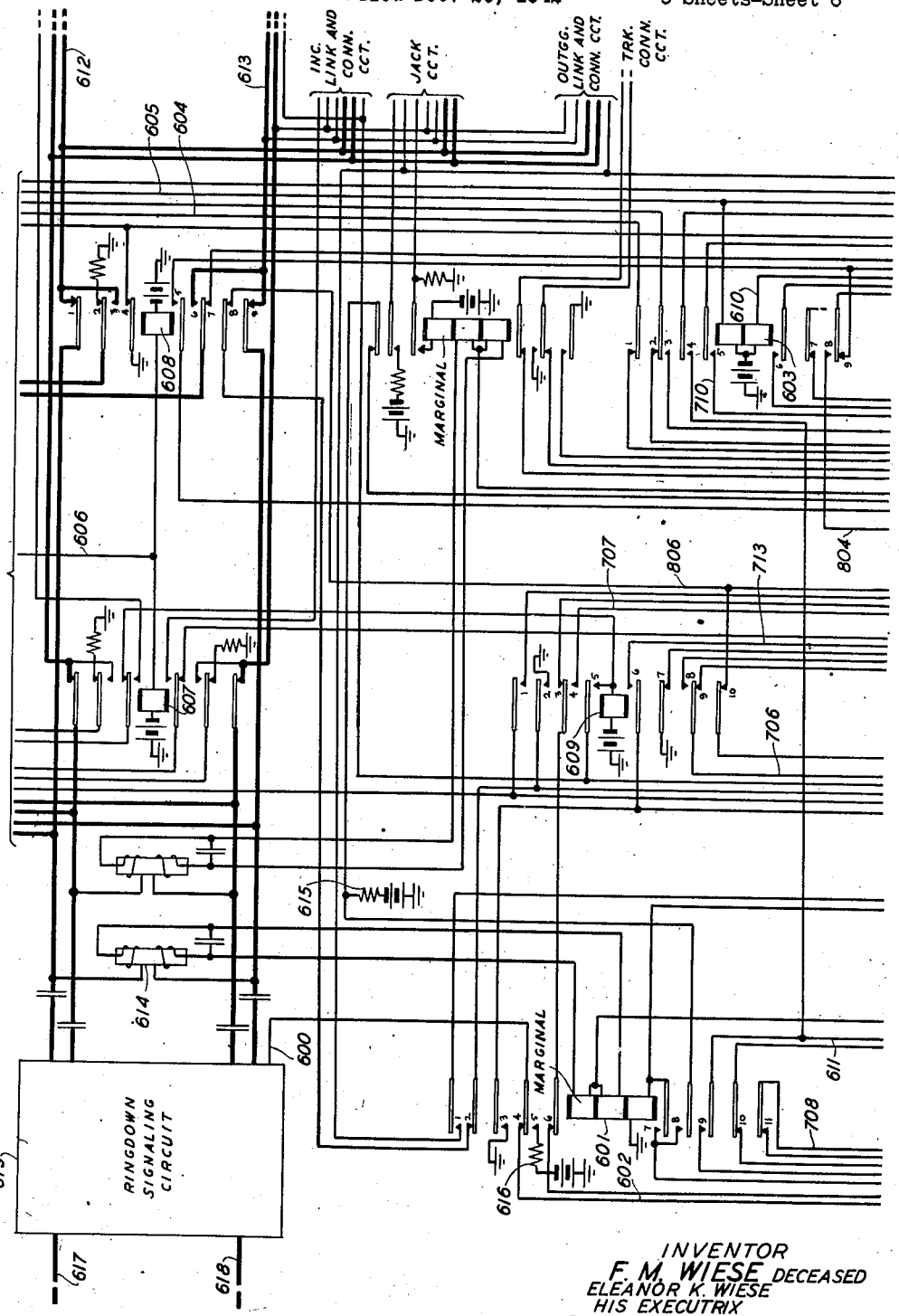

Assuming that, while ground is connected to select magnet 310, the trunk of Figs. 6, 7 and 8 is ready for one of the two-second time intervals, for example, that for checking the release of the trunk. This trunk is individual to the first vertical row of contacts 325 shown in Fig. 3 and, since no time interval has previously been measured, hold magnet 320 will be in its released condition with ground connected over its right back contact to conductor 611. Relay 703 operates as previously described. At its contact 1, relay 703 connects ground to conductor 712, completing a circuit over the left back contact of magnet 320 to the winding of relay 321 and battery. Relay 321, which is individual to the switch in which the vertical 325 is located, connects battery to the windings of all of the select magnets of this switch. Since ground is connected to the winding of magnet 310 at this time, magnet 310 operates and prepares the contacts of the No. 0 level. Magnet 310 also extends the ground connected to its contact by relay 400 to the winding of relay 322, which closes a holding circuit for relay 321 and also closes a circuit from battery through the winding of hold magnet 320, contact of relay 322, contact 4 of relay 703 to ground at contact 7 of relay 705. Hold magnet 320 operates and locks over its left contact to ground over conductor 712, at the same time closing the contacts of cross-point 323 and locking the trunk to the timing circuit. Magnet 320 opens the initial operating circuit for relay 321 but that relay is held operated as above indicated under the control of relay 322. Relay 322 connects all of the hold magnets of the switch to their associated trunks so that other trunks which have operated their relay corresponding to relay 703 may also be connected with the zero level.

At the end of the pulse, ground is removed from conductor 130 and relay 400 releases, opening the circuit of relay 322 which in turn opens the operating circuits for the hold magnets of the switch. Relay 400 opens the circuit of relay 401 but that relay is slow to release, thereby delaying the release of relay 402 which holds the select magnet operated until after relay 322 has released to prevent a hold magnet from operating and locking without closing a cross-point that is without closing a circuit for the timing signal which releases the trunk and hold magnet.

The primary distributor of Fig. 1 continues to operate and at the sixth subsequent pulse relay 126 is operated, closing a circuit from grounded conductor 904, outer left front contact of relay 126, conductor 140, winding of relay 403 to battery. Relay 403 connects ground from the contacts of relays 413 and 419, contact of relay 403 to conductor 423 which is connected to the top contacts in the zero level of the switch shown and also connects ground to similar contacts in all switches. Therefore, ground is connected over the top contact of cross-point 323 to conductor 711. Since, under the above assumption, relay 601 is not operated, the connection of ground to conductor 711 is ineffective. After two more pulses relay 128 is operated, closing a circuit from grounded conductor 904 over the outer left front contact of relay 128, conductor 141, windings of relays 404 and 405 in parallel to battery. Relay 404 connects ground from contacts of relays 412 to 418 to conductor 424 and the inner upper contacts of the zero level and therefore ground is connected over the inner upper contact of cross-point 323 to conductor 708. Under the condition assumed, ground on conductor 708 operates relay 801 to bring about the release of the trunk circuit. Relay 703 releases, opening the holding circuit for hold magnet 320, opening cross-point 323 and disconnecting the trunk from the time measuring circuit. Relay 404 also connects ground to the inner upper contacts of the No. 0 level of all of the other switches associated with the timing circuit.

Relay 405 connects ground to conductor 425 and to the next to bottom contact of the No. 0 level of the switch shown, as well as closing similar circuits to the other switches. Ground on conductor 425 is extended over the next to bottom contact of cross-point 323 to conductor 707, but, since it was assumed that the trunk was timing for release and relay 705 was operated, ground on conductor 707 is ineffective.

It may be noted that in the above case the circuit of hold magnet 320 was completed by direct ground at contact 7 of relay 705. When the timing circuit is called in following a response at the called office, the circuit of the hold magnet is completed by ground at contact 2 of relay 704 and when timing a ringing signal it is completed by ground at contact 3 of relay 601.

It will be apparent from the above description that if a trunk circuit grounds conductor 712 to start a time interval at the last possible point of the time during which a particular select magnet is prepared for operation, the time interval measured will be exactly 2 seconds. If the trunk requests timing an instant later, the hold magnet does not have time to operate and the trunk must wait .27 second until the select magnet of the next level is prepared after which the 2-second interval is measured. Therefore the difference between the minimum and maximum times measured by the present arrangement is only about one-eighth of the total time.

While only the function of the distributor relays in connection with the zero level has been described, it should be understood each relay in operating, operates a set of relays like relays 400, 401 and 402, to control the select magnet circuits of the corresponding level, operates a relay like relay 403 to transmit a 1.5-second signal to another level, and operates relays like 404 and 405 to transmit the 2-second signal to still another level, these signals being effective only if cross-points are closed in the latter levels. For example, relay 120, which prepares the select magnets of level No. 0, as above described, also operates relays to transmit the 1.5-second signal to level No. 4 and to transmit the 2-second signal to level No. 2. Similarly, relay 128, which operates relays 404 and 405 to transmit the 2-second signal to the zero level as described also controls the select magnets of the No. 8 level and causes the transmission of the 1.5-second signal to the No. 2 level.

Figure 2:
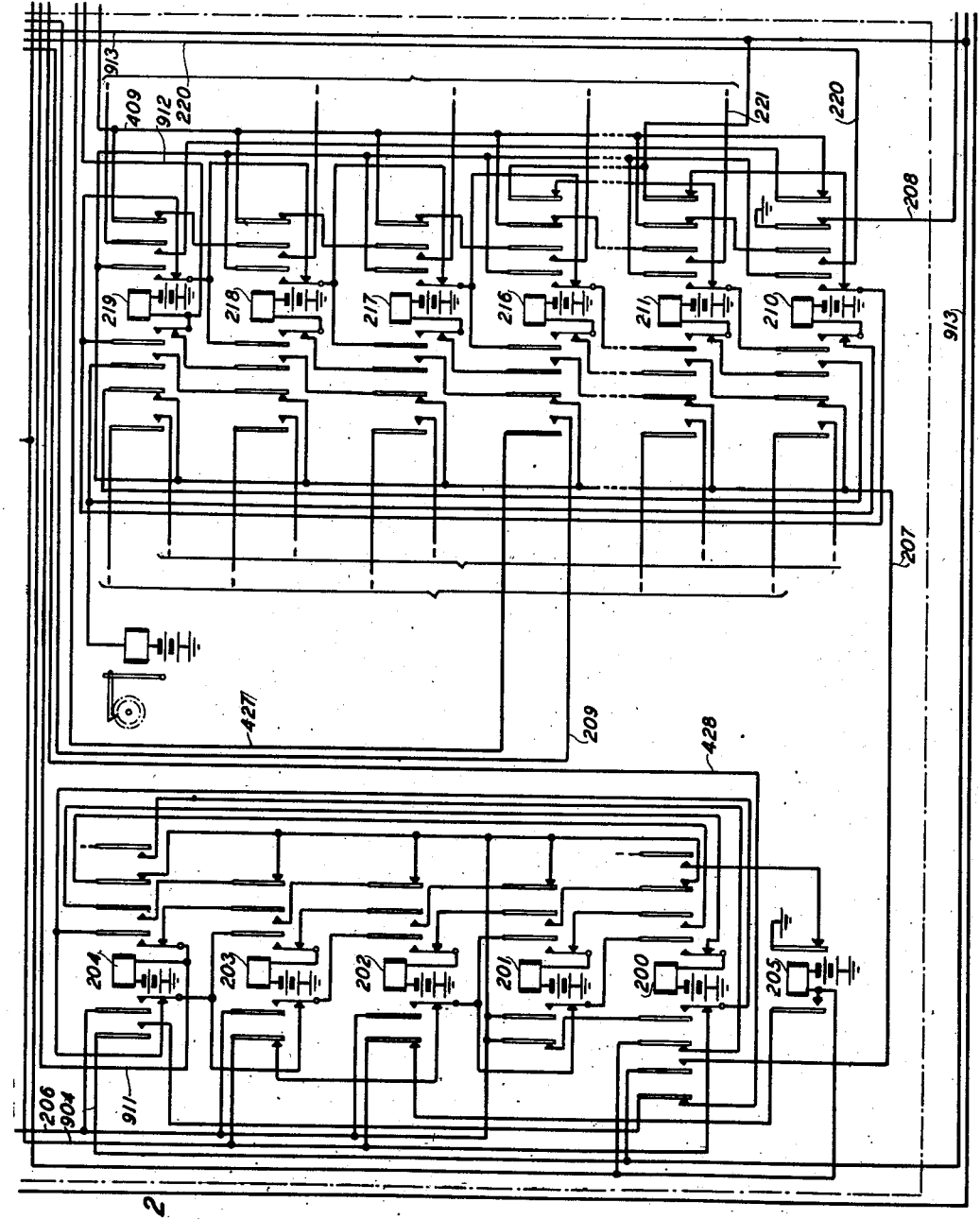
Fig. 2 shows the secondary pulse generator and relay distributor.

For the long time-out for a "don't-answer" condition, both the circuit of the hold magnet and the timing signal are controlled by the secondary pulse generator and distributor of Fig. 2. As in the case of the primary distributor of Fig. 1, relays 900 and 902 in the transfer circuit close a momentary circuit from ground over contact 4 of relay 900 and contact 7 of relay 902 to conductor 911, the winding of relay 204 and battery. Relay 204, operates, locking over its right alternate contacts and the left alternate contacts of relay 200 to ground on conductor 904. Similarly, a momentary circuit is closed over contact 8 of relay 900 and contact 4 of relay 902 to conductor 912, winding of relay 219 and battery. Relay 219 locks over its left alternate contacts, right normal contacts of relay 210, outermost back contact of relay 211, conductor 913 to ground at contact 8 of relay 900. Therefore, the secondary pulse generator and distributor are prepared for operation at the same time that the primary distributor is.

The secondary pulse generator comprises a chain of five relays, namely, relays 200 and 204, while the secondary distributor includes ten relays, namely, relays 210 to 219.

As soon as relay 204 operates, a circuit is closed from battery through the winding of relay 200, right normal contacts of relay 200, front contact of relay 204, back contact of relay 203, conductor 206, back contact of relay 128 to ground over conductor 904. Relay 200 operates and locks over its right alternate contacts, left normal contacts of relays 201 and 202, back contact of relay 203 to ground over conductor 904. At its left alternate contacts relay 200 extends the locking circuit of relay 204 over a back contact of relay 201 to ground over conductor 206. When relay 128 of the primary distributor operates, it disconnects ground from conductor 206 releasing relay 204. At the end of the pulse which operates relay 129, relay 128 releases again connecting ground to conductor 206 and completing a circuit over the back contact of relay 204, front contact of relay 200 and the normal contacts and winding of relay 201 to battery. Relay 201 locks under the control of relay 202 and transfers the locking circuit for relay 200 from conductor 904 to conductor 206 so that the next operation of relay 128 after a complete cycle of the primary distributor releases relay 200. Therefore it will be apparent that one relay of the secondary pulse generator is operated for each complete operation of the primary distributor of Fig. 1. Each time that relay 200 operates it connects ground from conductor 913 to conductor 207, thereby generating pulses for controlling the secondary distributor.

Conductor 206, is normally grounded over the back contact of relay 128. Relay 128 in operating removes ground from conductor 206 during one complete cycle of the primary impulse generator plus the closed period of a second cycle, that is, conductor 206 is grounded for approximately 2.2 seconds followed by an open period of .5 second. Conductor 207 is normally open at the contact of relay 200 but is grounded during the time that relay 200 remains operated which covers two ground pulses on conductor 206 plus the interval between them, that is, conductor 207 is open for approximately 8.5 seconds and is grounded for approximately 5 seconds.

The first ground pulse to conductor 207 completes a circuit from battery through the winding of relay 210, left normal contacts of relay 210, front contact of relay 219, back contact of relay 218, to ground on conductor 207. Relay 210 locks over its left alternate contacts, right normal contacts of relay 211, back contact of relay 216 to ground on conductor 913. At its right alternate contacts relay 210 transfers the holding circuit for relay 219 to conductor 207. At the end of the next cycle by the primary distributor relay 201 is operated and relay 200 released followed by the release of relay 219. Therefore one relay of the secondary distributor is operated for each cycle of the secondary pulse generator.

As in the case of the primary distributor each relay of the secondary distributor prepares a corresponding level of the switches for operation and directs a signal to another level bearing a predetermined relation to the level prepared.

As described for the shorter time periods, the circuits of the select magnets are prepared successively by the relays of the primary distributor, the circuits being closed for .21 second followed by open intervals of .06 second. Each select magnet when operated operates relay 322. When the trunk of Figs. 6, 7 and 8 is ready for the "don't-answer" time-out period, relay 703 operates from ground at the back contact of hold magnet 320 as before, and grounds conductor 712 to operate relay 321. However, since relays 704, 705 and 601 are not operated at this time, the operating circuit for hold magnet 320 extends over the contact of relay 322, contact 4 of relay 703, contact 3 of relay 702 or contact 6 of relay 609, to conductor 713 which returns to the timing circuit where it is connected to the front contact of relay 324.

The circuit of relay 324 extends over contact 2 of relay 321, contact 1 of relay 408 to ground over contacts of relays 420 and 414. Relay 408 operates in a circuit over conductor 409, over the back contact of one relay of the secondary distributor and the front contact of the next relay to the corresponding level relays operated by the primary distributor. Therefore, relay 324 can only be operated during the time that both the primary distributor and the secondary distributor are in condition to prepare a particular level. For example, both the zero relay in the primary distributor and the zero relay in the secondary distributor must be operated in order to connect a trunk with the zero level for a long time out. Similarly, the No. 1 relay in both distributors must be operated to connect a trunk with the No. 1 level. In this manner, since each relay of the secondary distributor is operated during one cycle of the secondary pulse generator the circuit of the relay 408 is closed five times for intervals of .27 second separated by intervals of 2.43 seconds. For example, when relay 400 is operated, indicating that the zero level is prepared, and relay 210 is also operated, the circuit above traced through the winding of relay 408 to conductor 409, is extended over the back contact of relay 211, front contact of relay 210, conductor 220, contact 7 of relay 400 to ground over conductor 913. This circuit is closed once during each of the five cycles of the primary distributor necessary to carry the secondary pulse generator through one cycle. With relay 408 operated, the previously traced circuit of relay 324 is completed.

Relay 324 connects ground to conductor 713 permitting hold magnet 320 of the associated trunk to operate and lock the trunk to the zero level. After six cycles of the secondary distributor, responsive to thirty cycles of the primary distributor, an interval of approximately 80 seconds will have been measured and relay 216 will be operated. With relay 216 operated to mark the sixth cycle of the secondary distributor, relay 204 operated to mark the end of a cycle by the secondary pulse generator and relay 120 operated, in turn operating relay 400, to mark the completion of the cycle for the zero level by the primary distributor, a circuit is closed from battery through the winding of relay 406, conductor 427, front contact of relay 216, conductor 209, contact 6 of relay 400, conductor 428, back contact of relay 200, front contact of relay 204 to grounded conductor 913. Relay 406 connects ground from the contacts of relays 410 and 416 to conductor 426, the lower contacts of the zero level of the switches and thence over the lower contact of cross-point 323 to conductor 707 which extends over contact 5 of relay 702 and contact 3 of relay 609 or over contact 4 of relay 609, contact 6 of relay 601, contact 2 of relay 703, contact 11 of relay 704, contact 11 of relay 705, contact 2 of relay 805 to the winding of relay 803 and battery. As previously described, the operation of relay 803 summons an operator, releases relay 703 and releases the timing circuit.

In order to guard against failure of the timing equipment, two such circuits are provided which are duplicates of each other. One timing circuit is normally idle while the other circuit is in service, and the transfer circuit of Fig. 9 serves to automatically transfer from one timing unit to the other either automatically or manually. For convenience, the unit shown may be called unit A while the circuit indicated by the box 914 may be identified as unit B. When unit A is in service relays 900 and 915 are operated as indicated.

Figure 5:
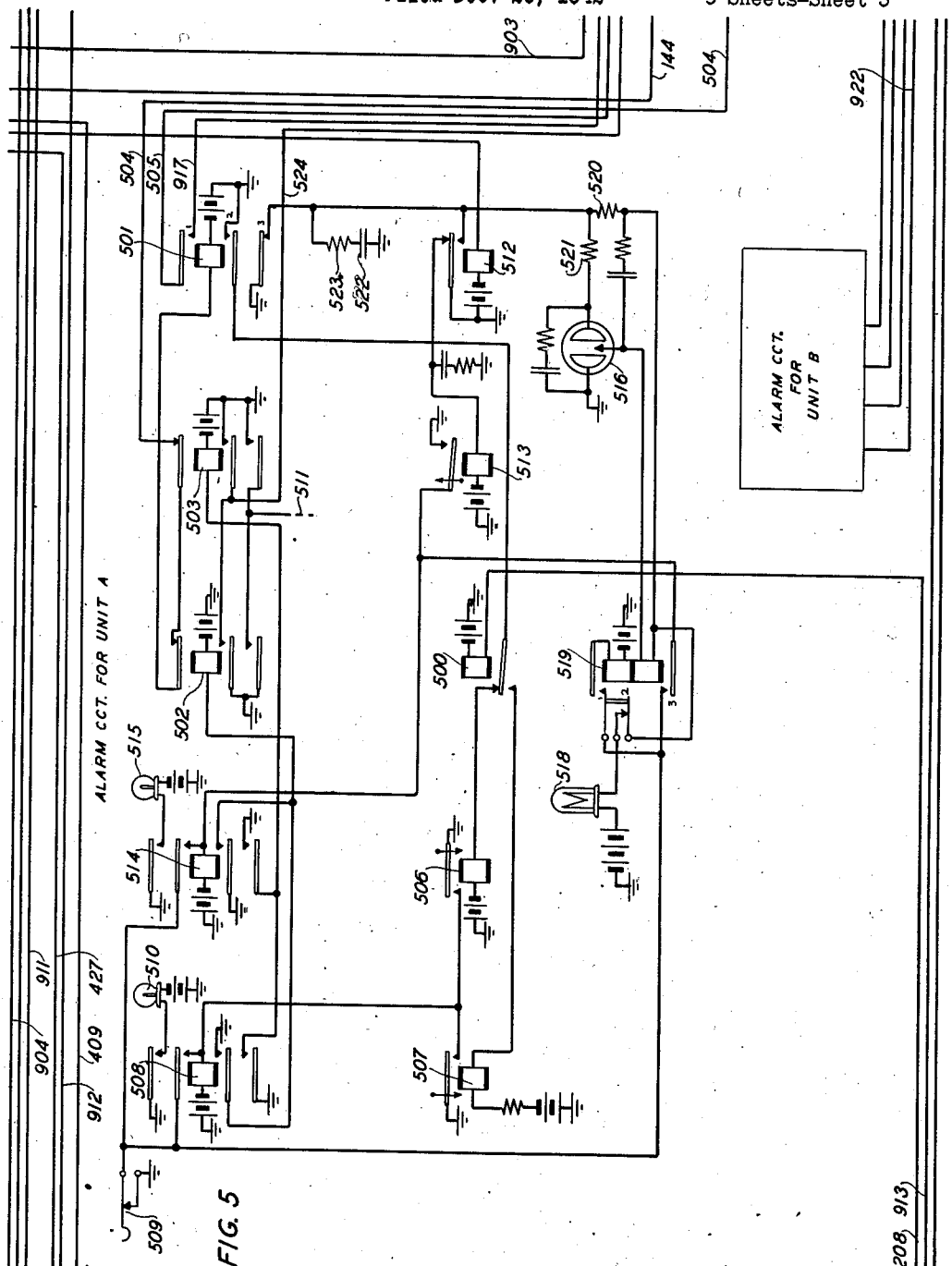
Fig. 5 shows a portion of the alarm circuit.

Furthermore, every part of the timing circuit is guarded against failure by trouble alarm circuits. Two typical alarm circuits are shown in Fig. 5. While unit A is in service a circuit is closed from battery through the winding of reley 501, over the back contacts of relays 502 and 503, conductor 504, contact 2 of relay 916, contact 2 of relay 902, contact 7 of relay 900 to ground. Relay 501 supplies ground to the various alarm circuits and locks under the control of relay 915, the circuit extending as above traced to conductor 504 and thence over contact 2 of rely 916, conductor 917, contact 1 of relay 501, conductor 505 to ground at contact 4 of relay 915. In order to determine that the secondary distributor is operating, relay 210 when normal closes a circuit from ground at its back contact over conductor 208 to the winding of relay 500 and battery. Relay 500, when operated, closes a circuit from ground on contact 2 of relay 501, front contact of relay 500 to the winding of relay 506 and battery. When relay 500 is released by the operation of relay 210 it closes a circuit from ground at contact 2 of relay 501, back contact of relay 500 through the winding of relay 507 to battery. Relays 506 and 507 are both slow to operate and are so adjusted that, if relay 500 continues to open and close its contacts according to the proper timing, neither relay 506 nor relay 507 will be able to close its front contact. If, for any reason, the secondary distributor fails to function, the operation of either relay 506 or relay 507 closes an obvious circuit for relay 508. Relay 508 locks under the control of key 509, lights lamp 510 to indicate the nature of the trouble and operates relays 502 and 503, in turn releasing relays 501, 507 and 506. Relays 502 and 503 connect ground to conductor 511 to operate an audible and visual alarm.

A similar alarm circuit is provided for each set of relays, like relays 400, 401 and 402, being controlled by ground connected to conductor 430 by relay 402.

Another typical alarm arrangement is that employed in connection with relay 408 which controls the closure of the hold magnet circuits for the long "don't-answer" time out. As set forth heretofore, relay 408 is operated five times during each operation of one of the relays of the secondary distributor, so that it is normally operated for about .2 second and released for about 2.5 seconds. Whenever relay 408 operates, it closes an obvious circuit for relay 512. Relay 512, when normal, holds relay 513 operated. When relay 512 operates, the circuit of relay 513 is opened but that relay is slow to release and delays the closure of its back contact for a time sufficient to cover the normal operated time of relay 408. If relay 512 remains operated long enough, relay 513 closes its back contact, operating relay 514 which locks under the control of key 503, lights lamp 515 to indicate the nature of the trouble and operates relays 502 and 503 to sound an alarm.

In order to check the failure of relay 408 to operate, gas-filled tube 516 is provided, having ground connected to one side of the control gap and +130-volt battery through ballast lamp 518 connected over contact 2 of relay 519 and resistances 520 and 521 to the other side of the control gap. Condenser 522 is connected through resistance 523 to the battery supplied to tube 516. Condenser 522 receives a charge from this +130-volt battery, but, each time that relay 512 operates, ground is connected over the front contact of relay 512 to condenser 522 discharging it. If now relay 512 fails to operate, condenser 522 continues to charge until a potential is reached which causes the control gap of tube 516 to break down. Relay 519, whose lower winding is included in the main gap circuit of the tube 516, operates locking to ground on key 509 and operating relay 514 to operate the alarm relays 502 and 503. Relay 519 also opens its original operating circuit thereby extinguishing tube 516.

Similar alarm circuits are provided for the signal control relays like relays 403, 404, 405 and 406. However, these alarm circuits include a marginal relay to guard against the false operation of more than one relay at a time.

Figure 4:
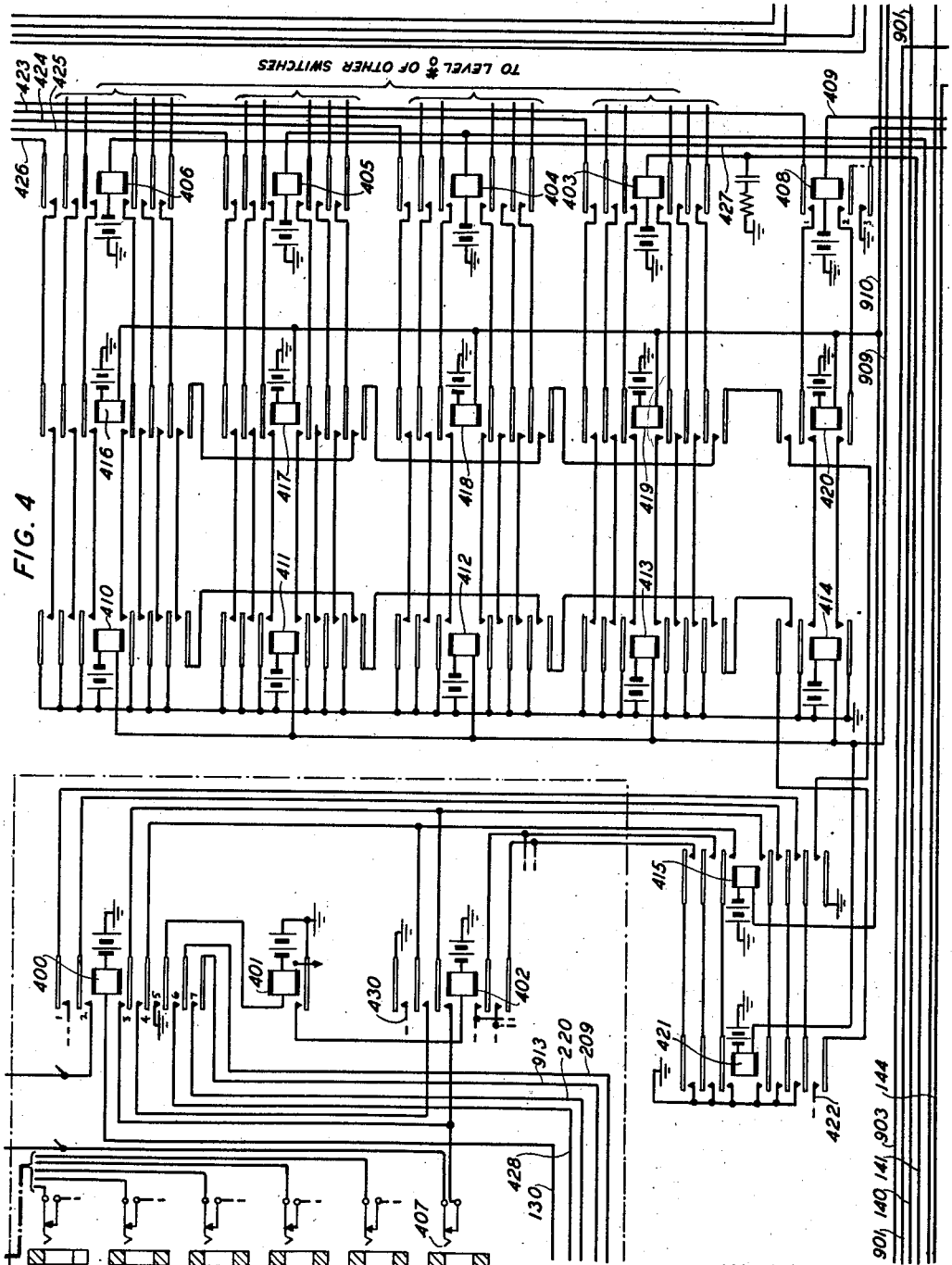
Fig. 4 shows some of the level controlling relays.

Whenever relays 502 and 503 operate, the circuit of relay 501 is opened and that relay releases, removing ground from the various trouble detecting circuits and closing ground to the various tube circuits to prevent the tubes from operating falsely while the alarm circuit is out of service. Whenever either relay 502 or relay 503 operates, ground is connected to conductor 524, completing a circuit over contact 4 of relay 918, normal contact and winding of relay 907, resistance 919 to battery. Relay 907 operates locking to ground over its contact 4. At contacts 1 and 2 relay 907 disconnects ground from conductors 909 and 910 releasing the ground feeding relays of Fig. 4. At contact 6 relay 907 opens the holding circuit for relay 900 which releases, further disconnecting ground from conductors 909 and 910, and also disconnecting ground from conductors 901, 904, 913 and 917. At contact 6 relay 907 closes a circuit through the winding of relay 920 to battery at contact 1 of relay 915. Relay 920 locks to battery on its contact 5 and connects ground to conductors 931 and 932 leading to unit B. At contact 7 relay 920 opens the circuit of relay 915 and that relay releases slowly, closing temporary circuits for starting the distributors of unit B similar to those described in the start of unit A. When relay 900 releases it closes an obvious circuit for relay 902.

In response to the audible alarm, the attendant will observe the lighted lamps to discover the cause of the trouble and will then operate key 509 to release the alarm relays. When these relays release, relays 502 and 503 release, removing the ground from conductor 524. Relay 907 in operating closed a circuit from battery through resistance 921, winding of relay 918 to ground at contact 4 of relay 907 but relay 918 was unable to operate at that time due to the closure of ground from conductor 524 over contacts 4 and 1 of relay 918 to resistance 921 in shunt of the winding of relay 918. The removal of ground from conductor 524 therefore permits relay 918 to operate, so that, while the B unit is in operation, relays 907 and 918 are operated.

If trouble should arise on the B unit while that unit is in service, the alarm circuit of that unit would connect ground to conductor 922 which would be extended over contacts 3 and 2 of relay 918 to battery through resistance 919 in shunt of the winding of relay 907, causing relay 907 to release. Relay 918 is held operated in a circuit from battery through resistance 921, winding of relay 918, contact 3 of relay 907, contact 3 of relay 918 to grounded conductor 922. The release of relay 907 opens the circuit of relay 920 causing that relay to release and reoperate relay 915. At contact 5 relay 907 recloses the circuit of relay 900 which reoperates releasing relay 902 and starting the A unit.

The transfer key 928 may be used to operate or release relays 907 and 918 which then function as above described to transfer from one unit to the other. Keys 923 and 924 serve to transfer from unit A to unit B and vice versa under manual control. The closure of key 923 operates relay 906 which operates relay 920, disconnects ground from conductors 909 and 910 and connects ground to the corresponding conductors of unit B. Key 924 operates relay 925 which in turn operates relay 900 and supplies ground to conductors 909 and 910. Keys 926 and 927 are used to exercise the circuit not in service, for example, after adjustment of a trouble condition. With relays 907 and 918 released and unit A in service, the operation of key 927 closes a circuit from battery through the winding of relay 929 to ground over contacts 5 of relay 907. Relay 929 lights lamp 930 and closes a circuit for operating relay 920. Relay 920 releases relay 915 and the pulse generators and distributors of unit B operate as previously described. However, with relays 906 and 907 both normal no ground is connected to conductors 931 and 932 leading to the ground control relays of the B unit. Therefore the operation of the distributors has no effect on the switch or trunks. When the B unit is in service, relays 918 and 907 are operated and the A unit may be exercised by operating key 926 which closes a circuit from battery through the winding of relay 933, contact of key 926, to ground at contact 6 of relay 907. Relay 933 lights lamp 934 and closes a circuit for operating relay 900 which functions to operate the pulse generators and the distributors of unit A. With relay 907 operated no ground is supplied to conductors 909 and 910 and therefore the switch and trunks are unaffected.

In the case of trouble on both units, an emergency timing circuit (not shown) is called in, which operates relay 905 to remove ground from conductors 909, 910, 931 and 932 to render both units ineffective.

A second primary pulse generator is also provided, which may be substituted for that shown in Fig. 1 by operating key 103, which closes an obvious circuit for relay 112. Relay 112 transfers conductors 901 and 115 to the spare pulse generator which thereafter controls the timing circuits as described. With relay 112 normal, relay 142 is held operated and with relay 112 operated, relay 143 is held operated. Relays 142 and 143 are slow to release and in combination with key 103 close a temporary circuit over conductor 144 for relay 916 to disable the alarm circuit to prevent false alarms due to the transfer.

What is claimed is:

1. In a telephone system, trunk circuits, certain stages in the operation of said trunk circuits requiring the measurement of a time interval, a time measuring arrangement common to said trunk circuits and means in said time measuring arrangement responsive to the start of one of said stages of operation of one of said trunk circuits for simultaneously associating said trunk circuit with said time measuring arrangement and starting the measurement of said time interval, said responsive means operating within a different time interval which is a fraction of said interval to be measured.

2. In a telephone system, trunk circuits, a relay in each of said trunk circuits operated at different stages in the operation of said trunk circuit to indicate that a timing operation is required, a time measuring arrangement common to said trunk circuits and means in said time measuring arrangement responsive to the operation of said relay in one of said trunk circuits for simultaneously associating said trunk circuit with said time measuring arrangement and starting the measurement of said time interval, said responsive means operating within a different time interval which is a fraction of said interval to be measured.

3. In a telephone system, a plurality of trunk circuits, common timing means, cross bar switches comprising a plurality of levels, means in said timing means for preparing the levels of said switches in rotation, means under the control of said trunk circuits for connecting said trunk circuits with a prepared level, and means in said timing means for transmitting a signal to said connected trunk circuits after a predetermined time interval.

4. In a telephone system, a plurality of trunk circuits, common timing means, cross bar switches comprising a plurality of levels, means in said timing means for preparing the levels of said switches in rotation, means under the control of said trunk circuits for connecting said trunk circuits with a prepared level, means in said timing means for transmitting a plurality of signals to said connected trunk circuits after predetermined time intervals, and means in said trunk circuits for rendering said trunk circuits responsive to the desired signal.

5. In a telephone system, a plurality of trunk circuits, common timing means, cross bar switches comprising a plurality of levels, means in said timing means for preparing the levels of said switches in rotation, means in said trunk circuits responsive to a plurality of different conditions for connecting said trunk circuits with a prepared level, means in said timing means for transmitting a plurality of signals to said connected trunk circuits after predetermined time intervals, and means in said trunk circuits for rendering said trunk circuits responsive to a particular signal in accordance with the condition under which each trunk circuit was connected with the timing means.

6. In a telephone system, a plurality of trunk circuits, a timing circuit, a cross bar switch comprising cross-points arranged in horizontal and vertical rows, a select magnet individual to each horizontal row, a hold magnet individual to each vertical row and to one of said trunk circuits, means in said timing circuit for preparing the circuits of said select magnets in rotation, means in one of said trunk circuits requiring timing for completing the operating circuit for the prepared select magnet, thereby preparing the cross-points in the corresponding horizontal row, means under the control of the operated select magnet for completing the circuit of the hold magnet individual to said one trunk circuit to close the corresponding cross-point in the prepared row, and means in said timing circuit to transmit a signal over said cross-point to said trunk circuit at the end of a measured time interval.

7. In a telephone system, a plurality of trunk circuits, a timing circuit, a cross bar switch comprising cross-points arranged in horizontal and vertical rows, a select magnet individual to each horizontal row, a hold magnet individual to each vertical row and to one of said trunk circuits, means in said timing circuit for preparing the circuits of said select magnets in rotation, means in one of said trunk circuits requiring timing for completing the operating circuit for the prepared select magnet thereby preparing the cross-points in the corresponding horizontal row, means under the control of the operated select magnet for completing the circuit of the hold magnet individual to said one trunk circuit to close the corresponding cross-point in the prepared row, means in said timing circuit to transmit a plurality of signals to said connected trunk circuit after predetermined time intervals, and means in said trunk circuit for rendering said trunk circuit responsive only to the desired signal.

8. In a telephone system, a plurality of trunk circuits, a timing circuit, a cross bar switch comprising cross-points arranged in horizontal and vertical rows, a select magnet individual to each horizontal row, a hold magnet individual to each vertical row and to one of said trunk circuits, means in said timing circuit for preparing the circuits of said select magnets in rotation, means in one of said trunk circuits responsive to a plurality of different conditions requiring timing for completing the operating circuit for the prepared select magnet thereby preparing the cross-points in the corresponding horizontal row, means under the control of the operated select magnet for completing the circuit of the hold magnet individual to said one trunk circuit to close the corresponding cross-point in the prepared row, and means in said timing circuit to transmit a plurality of signals to said connected trunk circuit after predetermined time intervals, and means in said trunk circuit for rendering said trunk circuit responsive to a particular signal in accordance with the condition under which the trunk circuit was connected with the timing means.

9. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a pulse generator, a relay distributor under the control of said pulse generator, and means under the control of said relay distributor for preparing the horizontal rows of contacts in said switch in rotation, and for transmitting a timing signal to the row of of contacts prepared by a predetermined previous relay of said distributor.

10. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a pulse generator, a relay distributor under the control of said pulse generator, means under the control of said distributor relays for preparing the horizontal rows of contacts in said switch in rotation, means under the control of one of said trunk circuits for closing one of said cross-points to start a time interval and means under the control of a predetermined subsequently operated relay of said distributor for transmitting a signal over said cross-point to one of said timing circuits to indicate the termination of said time interval.

11. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a pulse generator, a relay distributor under the control of said pulse generator, means under the control of said distributor relays for preparing the horizontal rows of contacts in said switch in rotation, means under the control of one of said trunk circuits for closing one of said cross-points to start a time interval and means effective following the operation of a predetermined number of relays of said distributor for transmitting a signal over said cross-point to one of said timing circuits to indicate the termination of said time interval.

12. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a pulse generator, a relay distributor under the control of said pulse generator, means under the control of said distributor relays for preparing the horizontal rows of contacts in said switch in rotation, means under the control of one of said trunk circuits for closing one of said cross-points to start a time interval, means effective following the operation of a predetermined number of relays of said distributor for transmitting a signal over said cross-point to one of said timing circuits to indicate the termination of said time interval, and means responsive to said signal to open said cross-point.

13. In a telephone system, a plurality of trunk circuits, a plurality of timing circuits, a relay in each of said trunk circuits for preparing said timing circuits at different stages of the operation of said trunk circuit, a cross bar switch comprising cross-points arranged in horizontal and vertical rows, the timing circuits of each trunk circuit extending to a different vertical row of contacts in said cross bar switch, a time measuring arrangement comprising a pulse generator, a relay distributor under the control of said pulse generator, means under the control of said distributor relays for preparing the horizontal rows of contacts in said switch in rotation, means under the control of said trunk circuit relay for closing one of said cross-points to start a time interval, means under the control of a predetermined subsequently operated distributor relay for transmitting a signal over said cross-point to one of said timing circuits to indicate the termination of said time interval, and means responsive to said signal to release said relay and open said cross-point.

14. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a primary pulse generator, a primary relay distributor under the control of said primary pulse generator, means under the control of each of said primary distributor relays for preparing the horizontal rows of contacts in said switch in rotation, and for transmitting a timing signal to the row of contacts prepared by a predetermined previous relay of said primary distributor, a secondary pulse generator responsive to a plurality of cycles of said primary distributor, a secondary relay distributor, means under the control of each relay of said secondary relay distributor for preparing one of the horizontal rows of contacts of said switch in rotation and for partially closing a circuit for transmitting a timing signal to the row of contacts prepared by a predetermined previous relay of said secondary distributor, and means under the joint control of said primary distributor and said secondary distributor and said trunk circuit for closing one cross-point of said switch and completing one of said timing circuits.

15. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk circuit extending to a different vertical row of contacts in said cross bar switch, a time measuring arrangement comprising a primary pulse generator, a primary relay distributor under the control of said primary pulse generator, means under the control of each of said primary distributor relays for preparing the horizontal rows of contacts in said switch in rotation, and for transmitting a timing signal to the row of contacts prepared by a predetermined previous relay of said primary distributor, a secondary pulse generator responsive to a plurality of cycles of said primary distributor, a secondary relay distributor, means under the control of each relay of said secondary relay distributor for preparing one of the horizontal rows of contacts of said switch in rotation and for partially closing a circuit for transmitting a timing signal to the row of contacts prepared by a predetermined previous relay of said secondary distributor, means effective only in response to the joint action of said trunk circuit at a particular stage of its operation and the simultaneous preparation of the same horizontal row of contacts by said primary distributor and said secondary distributor to complete a cross-point connecting said timing circuits with said time measuring arrangement, and means under the joint control of said primary distributor and said secondary distributor to transmit a timing signal to one of said timing circuits.

16. In a telephone system, a plurality of trunk circuits, a plurality of timing circuits prepared by said trunk circuits at different stages of their operation, a cross bar switch comprising cross-points arranged in horizontal and vertical rows, the timing circuits of each trunk extending to a different vertical row of contacts in said cross bar switch, a time measuring arrangement comprising a primary pulse generator, a primary relay distributor under the control of said primary pulse generator, means under the control of each of said primary distributor relays for preparing a horizontal row of contacts in said switch in rotation, and for transmitting a timing signal to the row of contacts prepared by a predetermined previous relay of said distributor, a secondary pulse generator responsive to a plurality of cycles of said primary distributor, a secondary relay distributor, means under the control of each relay of said secondary relay distributor for preparing a horizontal row of contacts of said switch in rotation and for partially closing a circuit for transmitting a timing signal to the row of contacts prepared by a predetermined previous relay of said secondary distributor, means effective only in response to the joint action of said trunk circuit at a particular stage of its operation and the simultaneous preparation of the same horizontal row of contacts by said primary distributor and said secondary distributor to complete a cross-point connecting said timing circuits with said time measuring arrangement thereby starting a time interval, and means under the joint control of said primary distributor and said secondary distributor following a predetermined number of cycles of said primary distributor to transmit a signal to one of said timing circuits to indicate the termination of said time interval.

17. In a telephone system, a plurality of trunk circuits, common timing means, means for connecting said timing means with said trunks comprising a plurality of levels each level including a set of contacts associated with each trunk, means in said timing means for preparing said levels in rotation, means under the control of said trunk circuits for operating the contacts associated with said trunk circuits in the prepared level to connect said trunk circuits with said level, and means in said timing means for transmitting a signal to said connected trunk circuits after a predetermined time interval.

18. In a telephone system, a plurality of trunk circuits, common timing means, means for connecting said timing means with said trunks comprising a plurality of levels each level including a set of contacts associated with each trunk, means in said timing means for preparing said levels in rotation, means under the control of said trunk circuits for operating the contacts associated with said trunk circuits in prepared levels to connect said trunk circuits with said levels, and means in said timing means for transmitting a signal to said levels in rotation at a predetermined time interval after each level was prepared to indicate the termination of said time intervals to the trunks connected with said levels.

19. In a telephone system, a plurality of trunk circuits, common timing means, means for connecting said timing means with said trunks comprising a plurality of levels each level including a set of contacts associated with each trunk, means in said timing means for preparing said levels in rotation, means in said trunk circuits responsive to a plurality of different conditions for operating the contacts associated with said trunk circuits in the prepared level to connect said trunk circuits with said prepared level, means in said timing means for transmitting a plurality of signals over the contacts of said level to said connected trunk circuits after predetermined time intervals, and means in said trunk circuits for rendering said trunk circuits responsive to a particular signal in accordance with the condition under which each trunk circuit was connected with the timing means.

ELEANOR K. WIESE,
*Executrix of the Estate of Floyd M. Wiese, Deceased.*